United States Patent [19]

Minerbo et al.

[11] Patent Number: 4,546,314
[45] Date of Patent: Oct. 8, 1985

[54] METHOD AND APPARATUS FOR MEASURING THE INSIDE DIAMETER OF A METALLIC PIPE IN A WELL

[75] Inventors: Gerald N. Minerbo, Missouri City, Tex.; R. Bruce McCann, Paris, France

[73] Assignee: Schlumberger Technology Corp., Houston, Tex.

[21] Appl. No.: 449,016

[22] Filed: Dec. 13, 1982

[51] Int. Cl.$^4$ .......................... G01N 27/72; G01B 7/12
[52] U.S. Cl. ..................................... 324/221; 324/346; 33/178 F
[58] Field of Search ................................. 324/219–221, 324/345, 346; 33/178 F, 178 E, DIG. 1

[56] References Cited

U.S. PATENT DOCUMENTS

| | | |
|---|---|---|
| 2,992,390 | 7/1961 | de Witte . |
| 3,051,892 | 8/1962 | Huston ........................... 324/221 X |
| 3,065,407 | 11/1962 | Huddleston, Jr. et al. .... 324/221 X |
| 3,417,325 | 12/1968 | McCollough et al. . |
| 3,940,689 | 2/1979 | Johnson, Jr. ......................... 324/221 |
| 4,292,588 | 9/1981 | Smith . |

OTHER PUBLICATIONS

Zaman et al., "Impedance of a Loop Surrounding a Conducting Cylinder", IEEE Transaction, Mar. 1981, pp. 41–45.
Dodd et al., "Analysis of the Eddy-Current Problem", American Society for Testing and Materials, ASTM STP 722, 1981, pp. 231–236.

Primary Examiner—Gerard R. Strecker
Assistant Examiner—Warren S. Edmonds

[57] ABSTRACT

A method and apparatus is disclosed for electrically measuring the inside diameter of a metallic pipe such as oil or gas well casing. The transimpedance of two coaxial coils within the pipe is determined and then resolved into its inphase and quadrature components. The difference of the magnitudes of the two components, $\Delta Z$, is approximated by a function independent of the electrical properties of the pipe but which is a function of the inside diameter of the pipe. The inside diameter is determined from the function in response to the measured $\Delta Z$ and may be recorded as a function of travel distance in the pipe.

17 Claims, 7 Drawing Figures

METHOD AND APPARATUS FOR MEASURING THE INSIDE DIAMETER OF A METALLIC PIPE IN A WELL

BACKGROUND OF THE INVENTION

1. Field of the Invention

This invention relates generally to a method and apparatus for electromagnetically measuring the inside diameter of a cylindrical structure and particularly relates to an electronic inside pipe caliper. More particularly, the invention relates to a method and apparatus for logging the inside diameter of oil and gas well tubular members, e.g., casing.

2. Description of the Prior Art

It is frequently necessary to measure the inside diameter of a pipe. This is particularly true of the casing of an oil well or of a string of tubing disposed within an oil well, for example, to extract oil or gas from the well.

Such metallic pipes are buried in the ground and, therefore, are not accessible for measurement. Both the inside and outside of such metallic pipes is subject to corrosion damage. The corrosion may be caused by injected fluids or by corrosive fluids within the ground. Besides, the pipe may be subjected to internal wear from the rods of pumps or from wear due to wire lines which may be sent into the well. Also, wear may be caused by drilling or fishing operations utilizing a drill pipe.

Measuring the damage of a pipe due to corrosion or wear is important in order to apply protective measures or to repair or replace the pipe when appropriate.

Of course, if should be realized that the internal diameter of the pipe in an oil well may vary due to permissible deviations of the wall thickness and of the nominal pipe diameter.

Because there is a real need to determine the inside diameter of buried metallic pipes, various instruments have been developed in the past for this purpose. Most of these instruments utilize mechanical feelers which are urged by spring means against the inner wall of the pipe. When one of the feelers is deflected due to the existence of pits, cracks, and other effects of corrosion or erosion of the pipe, an electric signal may be generated which is utilized to record such deviation. This may, for example, be effected by associating a magnet with the feelers. The magnet is rotated sequentially past the various feelers so that a deflection of the feeler changes the magnetic reluctance of the magnetic path which, in turn, induces an electrical signal that can be recorded. Alternatively, a potentiometer may be associated with a feeler for generating a signal proportional to the deflection of the feeler.

Some of these mechanical feeler calipers utilize two sets of feelers, one for measuring the maximum penetration of the feeler, while the other continuously measures the average penetration of the feelers.

However, a pipe caliper of the type having mechanical feelers has a number of disadvantages. For example, such an instrument cannot detect longitudinal splits or cracks of the pipe. The pipe may be covered with paraffin, scale or other non-metallic material which may cover up faults in the pipe. The feeler, of course, cannot distinguish between a metallic pipe and non-metallic material which may cover the pipe. Therefore, certain pits covered by hardened hydrocarbons and the like cannot be detected.

Finally, each of the many feelers may scratch the pipe or scratch off the protective coating of the pipe. Even if the pipe has not been covered with a protective coating, the scratches caused by the feelers may initiate further corrosion. Consequently, the mechanical feeler-type instrument may cause change to the pipe inside diameter it is intended to measure.

U.S. Pat. No. 3,417,325 issued to McCullough and Stroud discloses a purely electrical caliper for determining the inside diameter of a metallic pipe in which a transmitter coil and receiver coil are supported on a cylindrical housing of an sonde adapted for movement through oil well casings and the like. The transmitter is excited with a.c. current of the order of 10 to 50 kilocycles per second. The voltage induced in the receiver coil is taken as a measure of the average inside diameter of the pipe being measured.

It has been found in practice, however, that the apparatus disclosed in U.S. Pat. No. 3,417,325 yields erroneous results where either the conductivity, or permeability or both conductivity and permeability of the pipe being measured vary. In actual oil field practice the conductivity of steel tubular goods varies from a range of $2.6 \times 10^6$ mhos/meter to $7.8 \times 10^6$ mhos/meter. Also, as is well known, the permeability of oil field tubular goods varies significantly due to the mechanical shocks, heat treating, etc. to which the goods are subjected.

Thus, it is an object of this invention to provide an inside pipe caliper which operates on electrical principles which will overcome the disadvantages of prior instruments.

Another object of the invention is to provide an inside pipe caliper which generates a signal representative of the inside diameter of the pipe which is substantially insensitive to variations of conductivity and permeability of the pipe.

Another object of this invention is to provide well logging apparatus for logging borehole casing or tubing which yields an accurate log of the inside diameter of the casing versus depth, regardless of variations of casing conductivity or permeability.

SUMMARY OF THE INVENTION

The objects, features and advantages of the invention are the result of providing two coaxial coils within the pipe including a transmitter coil in which is generated an a.c. exciting current, and a receiver coil disposed a longitudinal distance from the transmitter coil for producing an induced voltage in response to the transmitter current. A circuit is provided to generate an impedance signal proportional to the ratio of the receiver voltage to the transmitter current. The impedance signal is resolved into its vector components including a quadrature impedance signal and an inphase impedance signal. Means are provided for linearly combining the quadrature impedance signal with the inphase impedance signal to generate a signal proportional to a function of the inside diameter of the pipe. Means are provided to determine the inside diameter of the pipe given the measured difference signal.

Apparatus is provided for moving the transmitter coil and the receiver coil as a unit axially within the pipe and for recording the inside diameter signal as a function of depth of the pipe to produce a log of inside diameter versus depth of the pipe.

One feature of the invention is to produce precomputed values of $a_1$, the inside radius of the pipe, as a function of the measured difference signal, $\Delta Z$, and to fit a polynomial function, $a_1 = f(\Delta Z)$ so that inside diameter signals $a_1$ may be easily determined after having measured $\Delta Z$.

BRIEF DESCRIPTION OF THE DRAWINGS

The invention, as well as additional objects and advantages thereof will best be understood from the following description when read in connection with the accompanying drawings, in which.

DESCRIPTION OF THE INVENTION

Figures 1, 2:
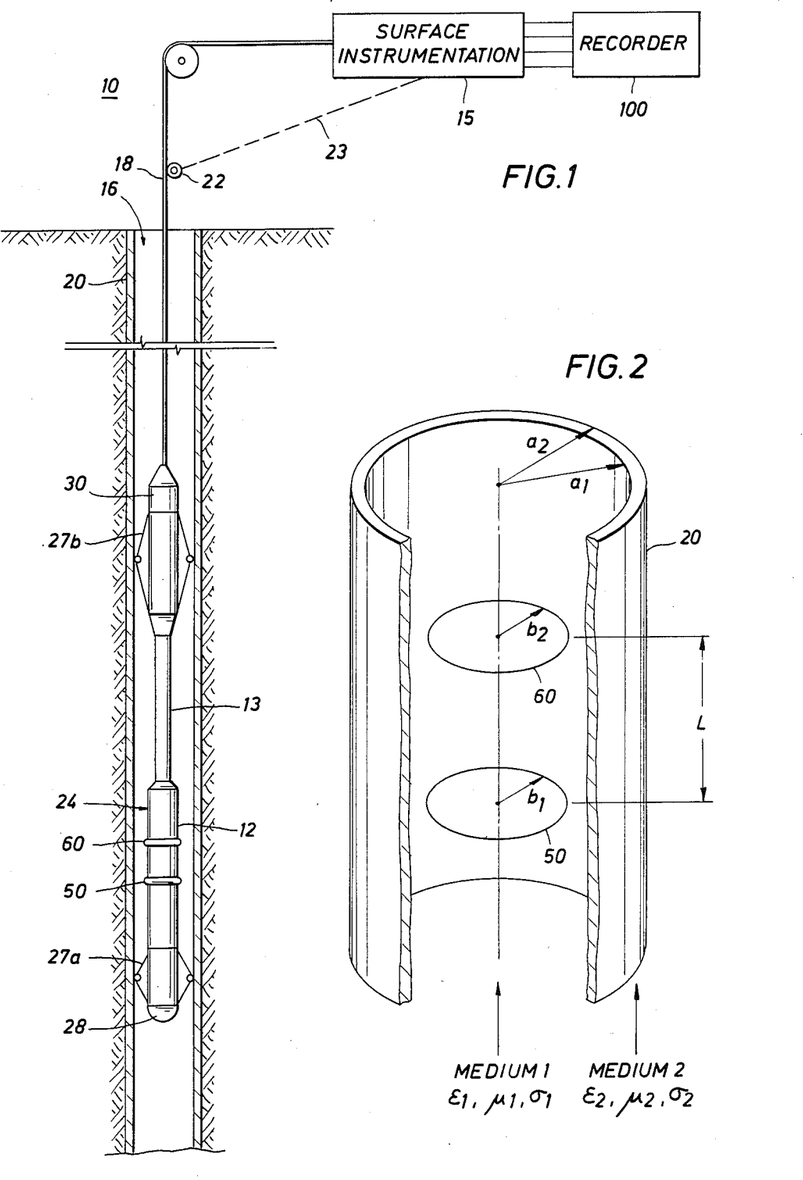
FIG. 1 schematically illustrates the downhole apparatus and surface instrumentation for a tubular goods caliper according to the invention.
FIG. 2 illustrates a theoretical model of transmitter and receiver coils for measuring the inside diameter of a metallic tubular member.

FIG. 1 shows schematically an electrical caliper tool 10 constructed in accordance with the invention. The tool 10 determines the inside diameter of tubular members, shown illustratively as casing 20 of borehole 16.

The tool includes a downhole sonde 12, downhole electronic cartridge 13, and surface equipment 14. The sonde 12 is adapted to be suspended in and movable through the tubular member or casing 20 by an armored cable, or wireline 18. The well bore 16 has a casing 20 having an inside diameter which the tool 10 is designed to measure as a function of well depth as the tool is raised or lowered within the casing 20. The wireline or cable 18 may be a single conductor (referred to as mono-cable) or multi-conductor (which may be a hepta-cable having seven conductors).

The surface equipment 14 communicates with the sonde 12 via the cable 18 for the purposes of controlling the position of the sonde 12 within the casing 20 and for receiving, processing, displaying, and recording signals transmitted from the sonde 12.

A cable-following mechanical transducer 22 and linkage 23 provides position signals indicative of the depth of the sonde 12 in the well bore 16. Typically, the transducer 22 takes the form of a calibrated pressure wheel urged against the wireline 18 and generates electrical pulses as the wheel rotates due to travel of the sonde 12 within the casing.

The down hole tool comprises a sonde 12, an electronic cartridge section 13, a pair of centralizers 27a, 27b, a tip or nose member 28 and a cable head adapter 30. The down hole tool is connected to the cable 18 via the cable head adapter 30.

The sonde 12 contains caliper coils 50, 60 for making electromagnetic measurements as a function of depth of the sonde in the casing. A signal is generated which is proportional to casing inside diameter. Other signals are generated which are representative of the ratio of casing permeability to casing conductivity.

Before specific apparatus is described which reside in electronic cartridge 13 or surface apparatus 14, reference is made to FIG. 2 for an exposition of the theoretical basis of the invention.

FIG. 2 shows a theoretical model of two coaxial coils 50, 60 separated from one another by a longitudinal distance L, both coils disposed coaxially within pipe or casing 20. The pipe inside radius is represented by $a_1$, its outside radius by $a_2$. The radius of receiver coil 60 is represented by $b_2$; the radius of transmitter coil 50 is represented by $b_1$. The electrical properties of medium 1 inside the pipe are $\epsilon_1, \mu_1, \sigma_1$, the permittivity, the permeability and the conductivity of the medium. Likewise, the properties of the pipe are represented by $\epsilon_2, \mu_2, \sigma_2$.

Using FIG. 2 as the basis for application of Maxwell's equations, it can be shown that $$Z = V/J \tag{1}$$

where Z represents the impedance ratio of the coils 60, 50, and V represents the voltage induced in receiver coil 60 in response to current J flowing in coil 50. The impedance Z can be written as $$Z = Z_0 + Z_p \tag{2}$$

where $Z_0$ is that part of the impedance caused by direct coupling between transmitter and receiver coils and $Z_p$ is that part of the impedance caused by the effect of the pipe 20.

It can be seen that $$Z_0 = -2i\omega\mu_1 b_1 b_2 \int_0^\infty I_1(\lambda b_2) K_1(\lambda b_1) \cos\lambda L d\lambda \tag{3}$$

$$Z_p = -2i\omega\mu_1 b_1 b_2 \int_0^\infty I_1(\lambda b_1) I_1(\lambda b_2) \Gamma_1(\lambda) \cos\lambda L d\lambda \tag{4}$$

where $$\Gamma_1(\lambda) = -\frac{K_1(\lambda a_1) - \lambda a_1 T K_0(\lambda a_1)}{I_1(\lambda a_1) + \lambda a_1 T I_0(\lambda a_1)} \tag{5}$$

$$i = \sqrt{-1}$$

$$T = \frac{1-i}{\sqrt{2}} \frac{\mu_2}{\mu_1} \frac{1}{a_1\sqrt{\sigma_2\mu_2\omega}} - \frac{i}{2} \frac{1}{\sigma_2\mu_1\omega a_1^2} \tag{6}$$

and where $I_1, K_1, I_0, K_0$, are Bessel functions.

Equation (4) can be expanded using equation (5) for $\Gamma$ and equation (6) for T, $$Z_p = Z_1 + Z_2 + Z_3 + \ldots \tag{7}$$

$$\left.\begin{array}{l} Z_1 = +2i\omega\mu_1 b_1 b_2 \int_0^\infty I_1(\lambda b_1) I_1(\lambda b_2) \dfrac{K_1(\lambda a_1)}{I_1(\lambda a_1)} \cos\lambda L d\lambda \\[1em] Z_2 = -2i\omega\mu_1 b_1 b_2 T \int_0^\infty \dfrac{I_1(\lambda b_1) I_1(\lambda b_2)}{I_1^2(\lambda a_1)} \cos\lambda L d\lambda \\[1em] Z_3 = +2i\omega\mu_1 b_1 b_2 T^2 \int_0^\infty \dfrac{\lambda a_1 I_1(\lambda b_1) I_1(\lambda b_1) I_0(\lambda a_1)}{I_1^3(\lambda a_1)} \cos\lambda L d\lambda \end{array}\right\} \tag{8}$$

Where the conductivity of the pipe is large, $$T \simeq \frac{1-i}{\sqrt{2}} \frac{\mu_2}{\mu_1} \frac{1}{a_1 \sqrt{\sigma_2 \mu_2 \omega}} \tag{9}$$

The measured impedance between the coils, $Z_{meas}$, has real and imaginary (quadrature) parts, $$Z_{meas} = ReZ_{meas} + iImZ_{meas} \tag{10}$$

Thus, for small T, $T^2$ is very small and $Z_3 \simeq 0$, $$ReZ_{meas} + iImZ_{meas} = i(|Z_1| - |Z_0|) + ReZ_2 + iImZ_2$$

$ReZ_{meas} = ReZ_2 = +ImZ_2$ because from (9) T has equal real and quadrature parts.

Therefore, $$ImZ_{meas} = |Z_1| - |Z_0| + ReZ_{meas} \tag{11}$$

$$\Delta Z = ReZ_{meas} - ImZ_{meas} = |Z_0| - |Z_1| \tag{12}$$

Equation 12 indicates that $$\Delta Z = ReZ_{meas} - ImZ_{meas} = 2\omega\mu_0 b^2 (ZINT0 - ZINT1) \tag{13}$$

where the coils 50 and 60 are of the same diameter b, the medium 1 permeability is that of free space $\mu_0$ and $$\left. \begin{array}{l} ZINT0 = \int_0^\infty I_1(\lambda b) K_1(\lambda b) \cos\lambda L d\lambda \\ \text{and} \\ ZINT1 = \int_0^\infty I_1^2(\lambda b) \frac{K_1(\lambda a_1)}{I_1(\lambda a_1)} \cos\lambda L d\lambda \end{array} \right\} \tag{14}$$

Where T from equation 9 is not small enough to ignore, it can be shown that $$\frac{ReZ - ImZ}{2\omega\mu_0 b^2} = (ZINT0 - ZINT1) + \tau^2 ZINT3 - \sqrt{2}\, \tau^3 ZINT4 + \tau^4 ZINT5 + \ldots \tag{15}$$

$$\frac{ReZ}{2\omega\mu_0 b^2} = -\frac{\tau}{\sqrt{2}} ZINT2 + \tau^2 ZINT3 - \frac{\tau^3}{\sqrt{2}} ZINT4 + \ldots$$

where, $$ZINT0 = \int_0^\infty I_1(\lambda b) K_1(\lambda b) \cos\lambda L d\lambda \tag{16}$$

$$ZINT1 = \int_0^\infty I_1^2(\lambda b) \frac{K_1(\lambda a_1)}{I_1(\lambda a_1)} \cos\lambda L d\lambda \tag{17}$$

$$ZINT2 = \int_0^\infty \frac{I_1^2(\lambda b)}{I_1^2(\lambda a_1)} \cos\lambda L d\lambda \tag{18}$$

$$ZINT3 = \int_0^\infty \frac{(\lambda a_1) I_1^2(\lambda b) I_0(\lambda a_1)}{I_1^3(\lambda a_1)} \cos\lambda L d\lambda \tag{19}$$

$$ZINT4 = \int_0^\infty \frac{(\lambda a_1)^2 I_1^2(\lambda b) I_0^2(\lambda a_1)}{I_1^4(\lambda a_1)} \cos\lambda L d\lambda \tag{20}$$

$$ZINT5 = \int_0^\infty \frac{(\lambda a_1)^3 I_1(\lambda b) I_0^2(\lambda a_1)}{I_1^5(\lambda a_1)} \cos\lambda L d\lambda \tag{21}$$

$$\tau = \frac{1}{a_1} \left( \sqrt{\frac{1}{\omega\mu_0}} \right) \left( \sqrt{\frac{\mu_r}{\sigma}} \right). \tag{22}$$

Thus, from equations (13) and (14) an accurate determination of $a_1$, the inside radius of the pipe 20, can be made by measuring the impedance between the coils, resolving the impedance into its quadrature (imaginary) and inphase (real) components, taking the difference between those components and determining $a_1$ which satisfies equation 14.

Advantageously, equation 14 may be precomputed for various $\Delta Z$ values as a function of $a_1$. A polynomial may be fitted to the functional relationship between $a_1$ and $\Delta Z$, or $$a_1 = f(\Delta Z). \tag{23}$$

The polynomial may be stored in the memory of a digital computer disposed in surface instrumentation 14, so that as $\Delta Z$ is measured as a function of depth in the well 16, $a_1$ may be easily determined.

Alternatively, equation (11) may be predetermined over a range of values of $\Delta Z$ and $a_1$ to produce a table of values which may be stored in a digital memory in surface instrumentation 14. The digital memory may then be addressed with a measured $\Delta Z$ value to generate a signal $a_1$ representative of the inside diameter of the pipe.

Where T is not small enough to neglect, equations 15 and 16 through 22 may be solved by first obtaining an initial estimate of $a_1$, the internal radius of the pipe, by assuming $\tau = 0$. Next, using the initial estimates of $a_1$, ZINT2, ZINT3, ZINT4, and ZINT5 are evaluated (it is assumed $\tau$ is sufficiently small to ignore higher order factors in the expansion). Then, $\tau$ from equation $$\frac{ReZ}{2\omega\mu_0 b^2} = -\frac{\tau}{\sqrt{2}} ZINT2 + \tau^2 ZINT3 - \frac{\tau^3}{\sqrt{3}} ZINT4$$

of equation 15 is determined. The new $\tau$ value is used in the equation $$\frac{ReZ - ImZ}{2\omega\mu_0 b^2} = (ZINT0 - ZINT1) + \tau^2 ZINT3 - \sqrt{2}\, \tau^3 ZINT4 + \tau^4 ZINT5 + \ldots$$

of equation 15.

The steps outlined above are repeated until values for $\tau$ and $a_1$ converge, that is until change is sufficiently small from one iteration to the next.

Figures 3, 3A:
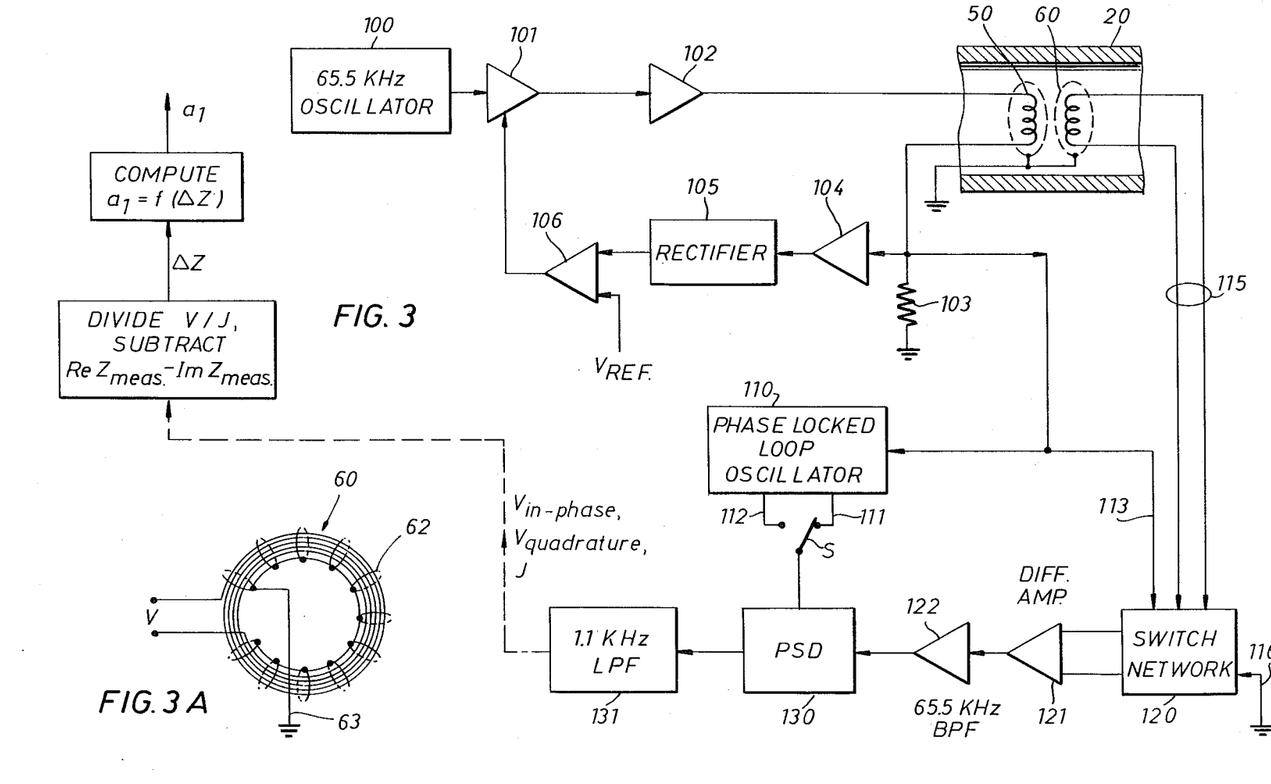
FIG. 3 illustrates electronic apparatus suitable for performing the measurement according to the invention.
FIG. 3A schematically illustrates the coil arrangement.

FIG. 3 illustrates the electronic circuitry necessary to implement the invention. Caliper coils 50,60 are shown schematically within casing 20. Transmitter coil 50 is excited by means of a 65.5 kHz crystal oscillator via summing amplifier 101 and driver amplifier 102. In order to insure that a constant current excites transmitter coil 50, a current sensing resistor 103 provides an output to sensing amplifier 104 proportional to the current through transmitter coil 50. The output of sensing amplifier 104 is applied to rectifier 105 where a rectified error signal is applied to a differential error amplifier 106 for comparison with a reference signal. The error signal from error amplifier 106 is fed back to summing amplifier 101, completing the feedback constant current circuit.

The signal from current sensing resistor 103 is applied to phase-locked loop oscillator 110 which generates reference signals in quadrature (e.g. 90° out of phase) with the transmitter current, on lead 111 and inphase (e.g., 180° out of phase) with transmitter current on lead 112. The current reference signal is also applied to switch network 120. A ground signal on lead 116 is additionally applied to switch network 120. Through switch network 120 it is possible to apply not only the received voltage on leads 115 to phase sensitive detector 130, but also a current signal on 113 and a ground signal 116, thereby providing ready means to calibrate the phase sensitive detector (PSD) 130 system for misalignment and drifts with temperature and time. The signal from switch network 120 is applied to PSD 130 via differential amplifier 121 and band pass filter 122 having a band pass frequency substantially the same as that of oscillator 100.

The output of the PSD 130 is applied to a low-pass filter 131 the output of which during logging operations is alternately the inphase and quadrature components of the voltage signal indicated in coil 60 measured with respect to the phase of the current driving transmitter coil 50. Switch S is alternately connected to leads 111,112 many times each second thereby producing many output readings each second, effectively insuring that for each depth location that coils 50,60 are measuring, several outputs of the inphase and quadrature components are available for further processing as described previously to generate an inside diameter measurement and a $\tau$ measurement indicative of the ratio of pipe permeability to conductivity.

The circuitry of FIG. 3 is preferably disposed in electronic cartridge 13, but may alternatively partially or totally reside in surface instrumentation, except input and output leads to coils 50 and 60. Preferably signals from the phase sensitive detector 130 are applied to surface instrumentation circuits 14 by means of telemetry circuits downhole and demodulation circuits uphole similar to that shown in U.S. Pat. No. 4,292,588 issued to Smith and incorporated herein.

FIG. 3A shows that coils 50 and 60 are preferably "caged", so as to prevent electric field coupling where logging is occurring in a salt-water filled environment. The coil 60 for example is constructed such that wires 62 are wrapped prependicularly to the sensing coils 60, yet wires 62 are not electrically connected; that is, each wire of coils 62 is cut so that current loops are not established around coil 60, yet the wires 62 effectively shield electric fields from coils 60. Each wire 62 is attached to a ground wire 63 as indicated in FIG. 3A.

Well logs of casing inside diameter are effected through the apparatus shown in FIGS. 1 and 3 and the processing steps outlined above are preferably carried out in surface instrumentation 14. Logs are generated by correlating the depth signals of the coils 50,60 through the use of measurement wheel 22 schematically shown connected to surface instrumentation 15, well known in the well logging art. A recorder 100 is provided for producing logs of casing inside diameter versus depth of the coils 50,60. The parameter $\tau$ proportional to the permeability-conductivity ratio may also be recorded as a function of logging depth.

Figure 4A:
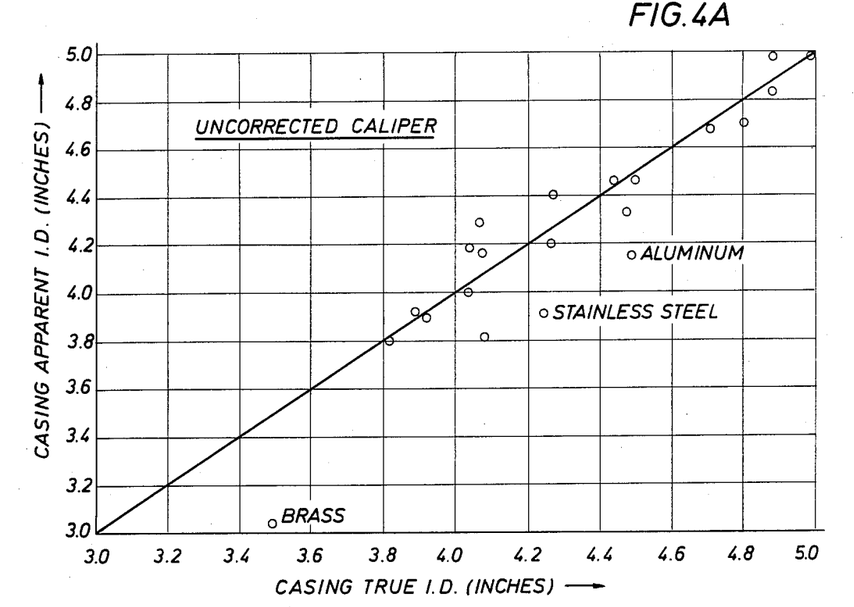
FIGS. 4A and 4B illustrate the error correcting efficiency according to one form of the invention.
Figure 4B:
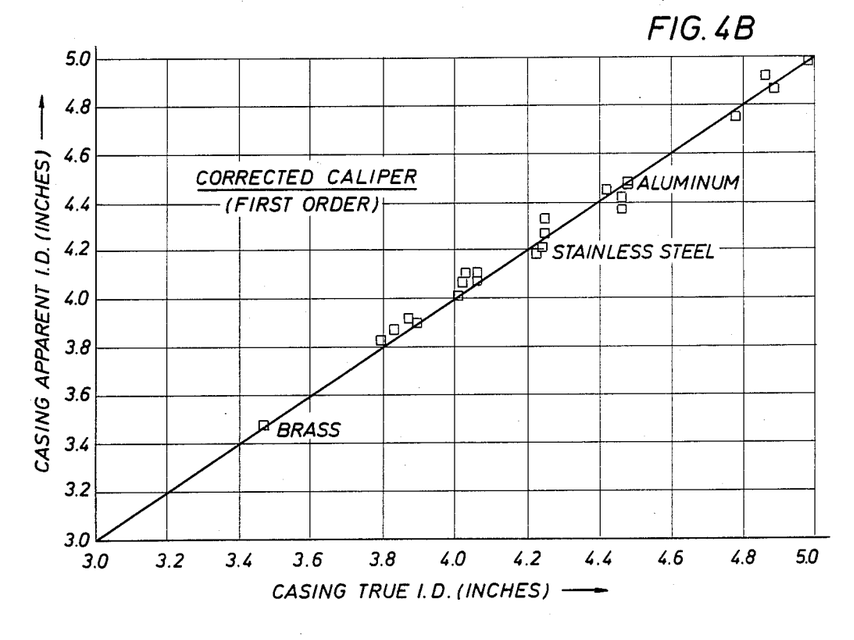

FIGS. 4A and 4B illustrate the efficacy of the invention in producing measurements of the inside diameter of tubular goods having wide variations in conductivity. FIG. 4A shows that significant errors result in the apparent inside diameter of pipe for tubular brass, stainless steel, aluminum and other ferrous pipes having different permeability-conductivity ratios. The results of FIG. 4A were generated in the prior known way of estimating inside diameter purely on the basis of the magnitude of received voltage of receiver coil 60. FIG. 4B shows that by providing the corrections indicated by equations 13 and 14 above, errors to the estimate of pipe inside diameter are significantly reduced.

Figure 5:
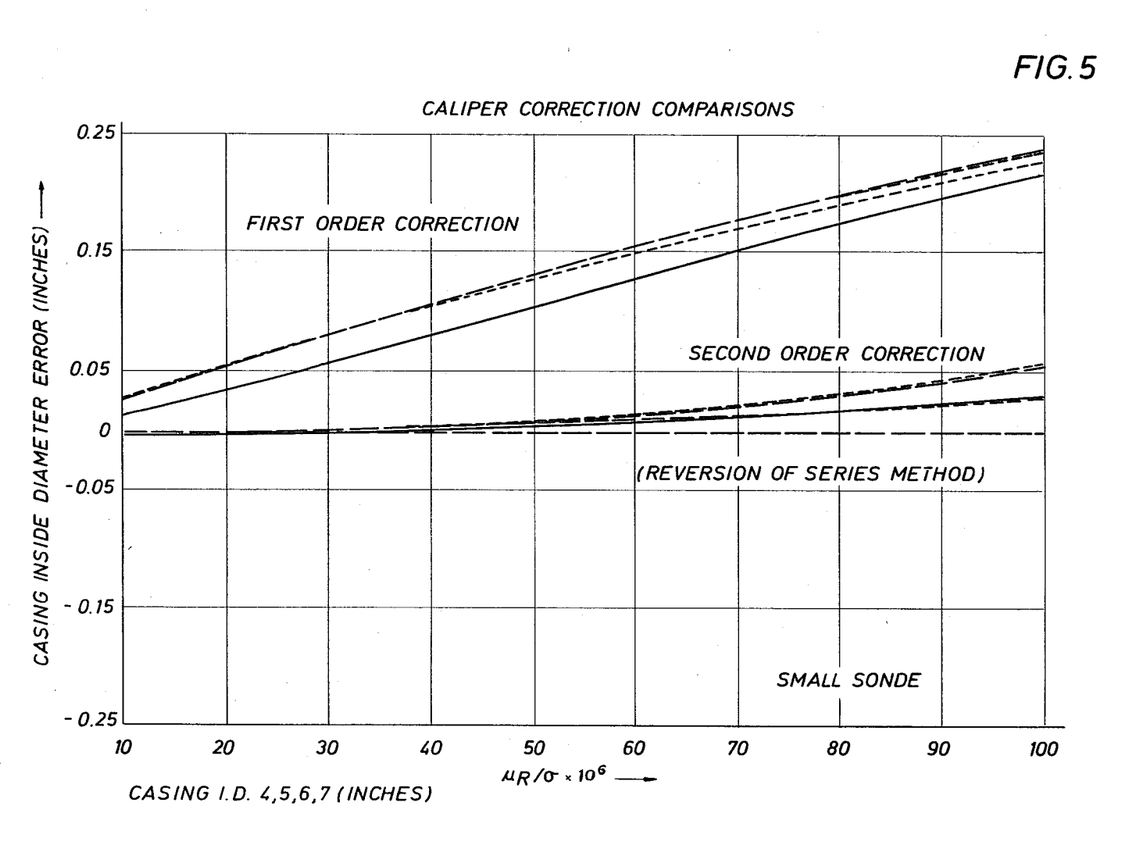
FIG. 5 illustrates the effect of first and second order corrections for pipes of varying inside diameters as a function of the ratio of permeability to conductivity of the pipes.

FIG. 5 illustrates the error expected in the measurement using the first order correction of equations 13 and 14 and the second order correction of equations 15 through 22. The error curves are presented as a function of $\mu/\sigma$ of the tube under investigation and shows curves of casing inside diameters of 4,5,6, and 7 inches. It is seen that substantial reduction in casing inside diameter errors are achieved for large $\mu/\sigma$ ratios.

Although the invention has been described in its preferred form with a certain degree of particularity, the present disclosure has been made only by way of example. Changes in the details and implementation of the preferred embodiment will be apparent without departing from the spirit and the scope of the invention. Even though the invention is described specifically for the casing inside diameter measurement of casings in down hole oil or gas wells, the invention could find ready application for the inside diameter measurement of any pipe for which access to the inside is the only practical measurement. The invention described herein could find ready application for the measurement of oil and gas pipe lines for example.

What is claimed is:

1. Apparatus for measuring the inside diameter of a metallic pipe in a well, comprising
   a support member, adapted for displacement through the pipe,
   transmitter means including a transmitter coil disposed on said support member for generating an a.c. transmitter current,
   receiver means including a receiver coil disposed on said support member a distance from said transmitter coil for producing a receiver voltage in response to the effect of said transmitter current on the pipe, said voltage including a component inphase with the transmitter current and a component in quadrature to the transmitter current,
   means responsive to said receiver means and said transmitter means for deriving a signal $\Delta Z$ representative of the difference between the real and imaginary components of the impedance, defined as the ratio of the receiver voltage to the transmitter current, said real component being in phase with the transmitter current and said imaginary component being in quadrature to the transmitter current, and
   means for deriving a signal representative of the inside diameter of the pipe from said difference signal $\Delta Z$, based on a predetermined relationship between the difference signal and the inside diameter.

2. The apparatus of claim 1 wherein the frequency of said a.c. transmitter current is about 65 kHz.

3. The apparatus of claim 1 further including means for moving the support member within the pipe.

4. The apparatus of claim 3 further including means for recording said inside diameter signal as a function of distance along the pipe.

5. The apparatus of claim 1 wherein said transmitter and receiver coils are coaxially supported on said support member.

6. The apparatus of claim 5 where the diameter of said transmitter coil and the diameter of the receiver coil are substantially the same.

7. The apparatus of claim 5 wherein said inside diameter of the pipe signal is obtained from computational means for solving the equation:

corrected measurement signal $\Delta Z = 2\omega\mu_0 b^2 (ZINT0 - ZINT1)$, where $$ZINT0 = \int_0^\infty I_1(\lambda b) K_1(\lambda b) \cos\lambda L \, d\lambda$$

$$ZINT1 = \int_0^\infty I_1^2(\lambda b) \frac{K_1(\lambda a_1)}{I_1(\lambda a_1)} \cos\lambda L \, d\lambda$$

and $a_1$ represents the inside radius of the pipe, b represents the radius of the transmitter and receiver coils, L is the distance between the transmitter coil and the receiver coil, $I_1(\lambda b)$ is a modified Bessel function of the first kind, $K_1(\lambda b)$ is a modified Bessel function of the second kind, $\lambda$ is a variable of integration, $\mu_0$ is the permeability of free space, and $\omega = 2\pi f$, is the radian frequency of the a.c. transmitter current.

8. The apparatus of claim 7 wherein the equation, $\Delta Z$ = corrected measurement signal = $2\omega\mu_0 b^2 (ZINT0 - ZINT1)$ is precomputed over a range of values of $\Delta Z$ and $a_1$ to produce a polynomial function $a_1 = f(\Delta Z)$, and a signal, $a_1$, representative of the inside radius of the pipe is generated by solving said polynomial as a function of $\Delta Z$.

9. The apparatus of claim 7 wherein the equation $\Delta Z$ = corrected measurement signal = $2\omega\mu_0 b^2 (ZINT0 - ZINT1)$ is predetermined over a range of values of $\Delta Z$ and $a_1$ to produce a table of values, and said table of values is stored in a digital memory, and wherein said apparatus further includes means for addressing said digital memory with said a measured $\Delta Z$ value to generate a signal $a_1$ representative of the inside radius of the pipe.

10. A method for determining the inside diameter of a metallic pipe located in a well, comprising applying a current to a transmitter coil positioned inside the pipe and coaxially thereto, detecting the voltage induced by said current in a receiver coil longitudinally spaced from, and coaxial to, the transmitter coil, said voltage including a component in-phase with the transmitter current and a component in quadrature to the transmitter current, deriving a signal $\Delta Z$ representative of the difference between the real and imaginary components of the impedance, defined as the ratio of the receiver voltage to the transmitter current, said real component being in phase with the transmitter current and said imaginary component being in quadrature to the transmitter current, deriving a signal representative of the inside diameter of the pipe from said difference signal $\Delta Z$ based on a predetermined relationship between the difference signal and the inside diameter.

11. The method of claim 10, wherein said relationship between the difference signal $\Delta Z$ and the inside diameter is:

$\Delta Z = 2\omega\mu_0 b^2 (ZINT0 - ZINT1)$ where $$ZINT0 = \int_0^\infty I_1(\lambda b) K_1(\lambda b) \cos\lambda L \, d\lambda$$

$$ZINT1 = \int_0^\infty I_1^2(\lambda b) \frac{K_1(\lambda a_1)}{I_1(\lambda a_1)} \cos\lambda L \, d\lambda$$

and $a_1$ represents the inside radius of the pipe, b represents the radius of the transmitter and receiver coils, L is the distance between the transmitter and the receiver coil, $I_1(\lambda b)$ is a modified Bessel function of the first kind, $K_1(\lambda b)$ is a modified Bessel function of the second kind, $\lambda$ is a variable of integration, $\mu_0$ is the permeability of free space, and $\omega = 2\pi f$, is the radian frequency of the a.c. transmitter current.

12. A method for producing a signal related to the inside diameter of a pipe located in a well, comprising applying a current to a transmitter coil positioned inside the pipe and coaxially thereto, detecting the voltage induced by said current in a receiver coil longitudinally spaced from, and coaxial to, the transmitter coil, said voltage including a component in-phase with the transmitter current and a component in quadrature to the transmitter current, deriving a signal $\Delta Z$ representative of the difference between the real and imaginary components of the impedance, defined as the ratio of the receiver voltage to the transmitter current, said real component being in phase with the transmitter current and said imaginary component being in quadrature to the transmitter current, said difference signal Z being related to the inside diameter of the pipe and having a reduced sensitivity to the permeability and conductivity of the pipe.

13. The method of claim 12, wherein said deriving step includes the steps of, deriving said in-phase and said quadrature voltage components from said receiver voltage, and measuring said transmitter current.

14. An apparatus for producing a signal related to the inside diameter of a pipe located in a well, comprising
a support member, adapted for displacement through the pipe,
transmitter means including a transmitter coil disposed on said support member for generating an a.c. transmitter current,
receiver means including a receiver coil disposed on said support member a distance from said transmitter coil for producing a receiver voltage in response to the effect of said transmitter current on the pipe, said voltage including a component in-phase with the transmitter current and a component in quadrature to the transmitter current,
means responsive to said receiver means and to said transmitter means for generating a signal $\Delta Z$ equal to the difference between the real and the imaginary parts of an impedance signal defined as the ratio of the receiver voltage to the transmitter current, said real part being the component in-phase with the transmitter current and said imaginary part being the component in quadrature to the transmitter current, said difference signal $\Delta Z$ being related to the inside diameter of the pipe and having a reduced sensitivity to the permeability and conductivity of the pipe.

15. The apparatus of claim 14, wherein said generating means includes a phase sensitive detector having inputs connected to the receiver coil, and means for generating phase reference signals respectively in phase with, and in quadrature to the transmitter current, said reference signals being applied to the phase sensitive detector.

16. The apparatus of claim 15, comprising switch means connected between the receiver coil and the phase sensitive detector and having an input connected to the transmitting means, whereby a signal indicative of the transmitter current can be applied to the phase sensitive detector.

17. The apparatus of claim 16, wherein said switch means includes an additional input connected to the ground.

* * * * *